United States Patent
Kobylinski et al.

(10) Patent No.: US 7,823,029 B2
(45) Date of Patent: Oct. 26, 2010

(54) FAILURE RECOGNITION, NOTIFICATION, AND PREVENTION FOR LEARNING AND SELF-HEALING CAPABILITIES IN A MONITORED SYSTEM

(75) Inventors: Krzysztof R. Kobylinski, Toronto (CA); Eric Labadie, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 675 days.

(21) Appl. No.: 11/220,963

(22) Filed: Sep. 7, 2005

(65) Prior Publication Data

US 2007/0055915 A1    Mar. 8, 2007

(51) Int. Cl.
G06F 11/00    (2006.01)
(52) U.S. Cl. .............................. 714/47; 714/48; 714/38; 714/26; 714/23
(58) Field of Classification Search .................. 714/48, 714/38, 47, 23, 26
See application file for complete search history.

(56) References Cited

U.S. PATENT DOCUMENTS

| | | | | |
|---|---|---|---|---|
| 5,226,118 | A * | 7/1993 | Baker et al. ................. | 715/833 |
| 5,235,599 | A | 8/1993 | Nishimura et al. | |
| 5,715,386 | A * | 2/1998 | Fulton et al. .................. | 714/38 |
| 5,933,422 | A | 8/1999 | Kusano et al. | |
| 5,941,955 | A | 8/1999 | Wilby et al. | |
| 5,948,112 | A * | 9/1999 | Shimada et al. ............... | 714/16 |
| 6,018,300 | A | 1/2000 | Dowden et al. | |
| 6,167,538 | A * | 12/2000 | Neufeld et al. ................. | 714/47 |
| 6,457,142 | B1 * | 9/2002 | Klemm et al. ................. | 714/38 |
| 6,594,774 | B1 * | 7/2003 | Chapman et al. ................ | 714/2 |
| 6,594,784 | B1 * | 7/2003 | Harper et al. .................. | 714/47 |
| 6,609,212 | B1 * | 8/2003 | Smith ............................ | 714/4 |
| 6,618,823 | B1 | 9/2003 | West | |
| 6,629,266 | B1 * | 9/2003 | Harper et al. .................. | 714/38 |
| 6,718,513 | B1 * | 4/2004 | Ryu ............................ | 714/799 |
| 6,735,704 | B1 | 5/2004 | Butka et al. | |
| 6,745,383 | B1 * | 6/2004 | Agarwal et al. ............. | 717/132 |
| 6,754,855 | B1 | 6/2004 | Denninghoff et al. | |
| 6,883,120 | B1 * | 4/2005 | Banga .......................... | 714/47 |
| 7,000,154 | B1 * | 2/2006 | LeDuc et al. ................... | 714/47 |
| 7,062,409 | B2 * | 6/2006 | Kadota ......................... | 702/182 |
| 7,254,750 | B1 * | 8/2007 | Okun et al. .................... | 714/47 |
| 2003/0037289 | A1 * | 2/2003 | Singh et al. .................... | 714/38 |
| 2003/0110007 | A1 * | 6/2003 | McGee et al. ............... | 702/179 |
| 2004/0153708 | A1 * | 8/2004 | Joshi et al. ...................... | 714/4 |
| 2005/0143956 | A1 * | 6/2005 | Long et al. ................... | 702/184 |

(Continued)

FOREIGN PATENT DOCUMENTS

JP    9270852    10/1997

*Primary Examiner*—Scott T Baderman
*Assistant Examiner*—Chae Ko
(74) *Attorney, Agent, or Firm*—Steven L. Nichols; Vancott, Bagley Cornwall & McCarthy PC (57) ABSTRACT

The present invention provides failure recognition, notification, and prevention for learning and self-healing capabilities in a monitored system. A system to collect monitoring data is monitored. A failure of the system is detected; A failure point for the detected failure in a data space defined by the monitoring data is identified and at least one predefined action with the identified failure point is associated. This process is repeated for a plurality of system failures. When a state of the system is determined to be approaching an identified failure point, the at least one predefined action associated with that identified failure point is performed.

7 Claims, 8 Drawing Sheets

U.S. PATENT DOCUMENTS

| | | |
|---|---|---|
| 2005/0246590 A1* | 11/2005 | Lancaster .................... 714/47 |
| 2005/0257094 A1* | 11/2005 | Dawkins et al. ............... 714/38 |
| 2006/0010352 A1* | 1/2006 | Mukherjee et al. ............ 714/47 |
| 2006/0026467 A1* | 2/2006 | Nehab et al. .................. 714/38 |
| 2006/0031042 A1* | 2/2006 | Ogura et al. ................. 702/184 |
| 2006/0209675 A1* | 9/2006 | Jacobson .................... 370/216 |
| 2007/0055915 A1* | 3/2007 | Kobylinski et al. ........... 714/47 |

* cited by examiner

FAILURE RECOGNITION, NOTIFICATION, AND PREVENTION FOR LEARNING AND SELF-HEALING CAPABILITIES IN A MONITORED SYSTEM

BACKGROUND OF THE INVENTION

The present invention generally relates to computer systems. More particularly, the present invention provides a failure recognition, notification, and prevention method, system, and computer program product for learning and self-healing capabilities in a monitored system.

In recent years the complexity of computer systems, software systems, and the like has increased dramatically. Although manufacturers of such complex systems have attempted to ensure that such systems operate reliably, it is difficult to prevent failures of some type from occurring at various times during system operation. As a result, the ability to reliably predict potential/actual failures of such systems has become a topic of concern to both manufacturers and users of such systems.

BRIEF SUMMARY OF THE INVENTION

A first aspect of the present invention is directed to a method for failure recognition that comprises monitoring a system to collect monitoring data, detecting a failure of the system, identifying a failure point for the detected failure in a data space defined by the monitoring data, and associating at least one predefined action with the identified failure point.

A second aspect of the present invention is directed to a system for failure recognition that comprises means for monitoring a system to collect monitoring data, means for detecting at least one failure of the monitored system, means for identifying a failure point for each detected failure in a data space defined by the monitoring data, and means for associating at least one predefined action with each identified failure point.

A third aspect of the present invention is directed to a computer program product stored on a computer useable medium for failure recognition. The computer useable medium comprises computer usable program code. The computer usable program code comprises computer useable program configured to monitor a system to collect monitoring data, computer usable program code configured to detect a failure of the system, computer usable program code configured to identify a failure point for the detected failure in a data space defined by the monitoring data and computer usable program code configured to associate at least one predefined action with the identified failure point.

A fourth aspect of the present invention provides a failure learning process that comprises monitoring a system to collect monitoring data, detecting a failure of the system, identifying a failure point for the detected failure in a data space defined by the monitoring data, associating at least one predefined action with the identified failure point, storing information regarding the identified failure point and each predefined action associated therewith, and repeating each of the above steps to learn additional failure points.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer-usable or computer-readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-usable or computer-readable would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
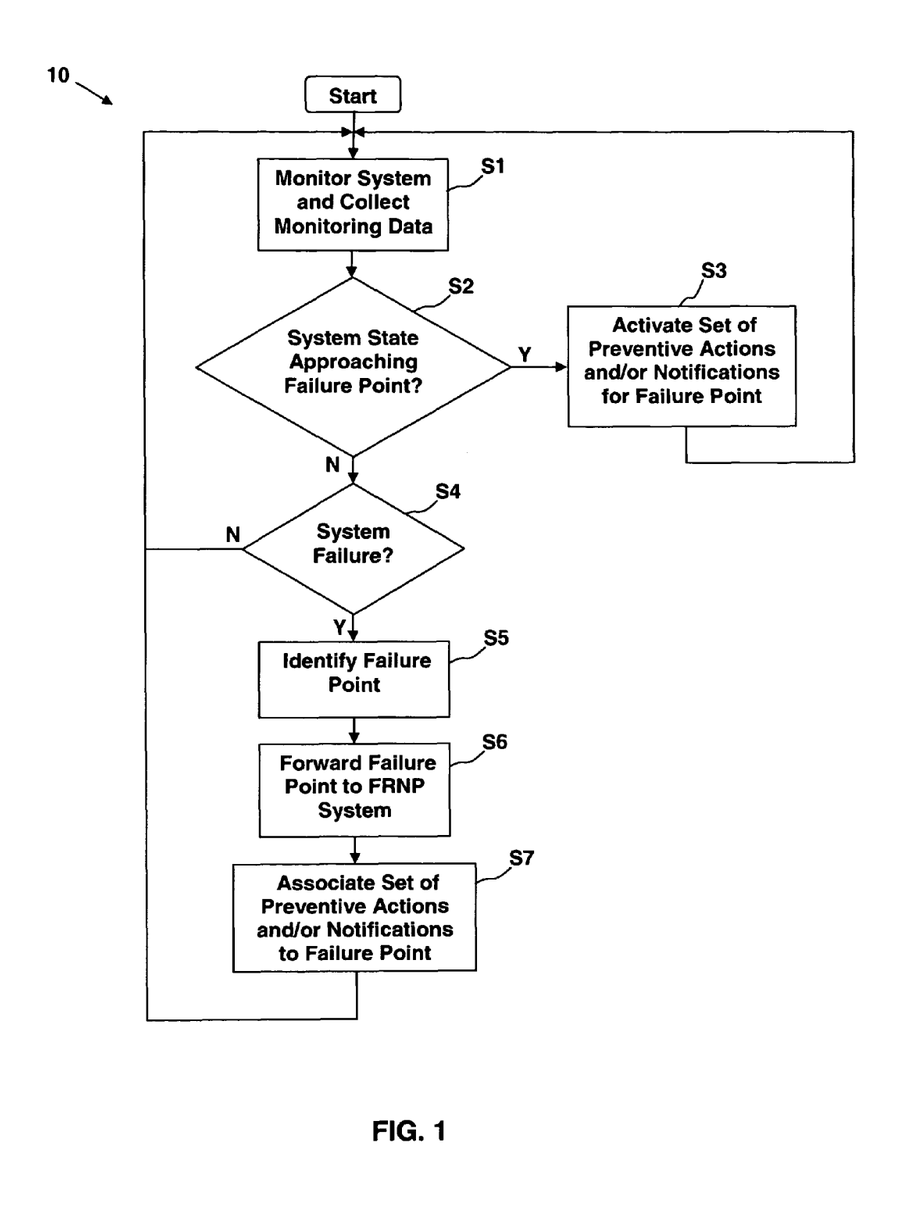
FIG. 1 depicts a flow diagram of a method in accordance with an embodiment of the present invention.

A flow diagram 10 of a method in accordance with an embodiment of the present invention is depicted in FIG. 1. In this example, it is assumed that the system being monitored comprises an enterprise system and that the predetermined set of data that is monitored comprises tracing-resource-logging data. However, it will be apparent to one skilled in the art that the present invention can be applied to many other types of systems including, for example, computer systems, software systems, computer hardware systems, hardware/software control systems, adaptive control systems, etc., and that the predetermined set of data to be monitored will generally be different for different systems. In general, the present invention can be used with any system in which system failure points and system state can be represented by sets of data in a multi-dimensional data space. The flow diagram 10 of FIG. 1 will be described below with regard to the system illustrated in FIG. 2.

Figure 2:
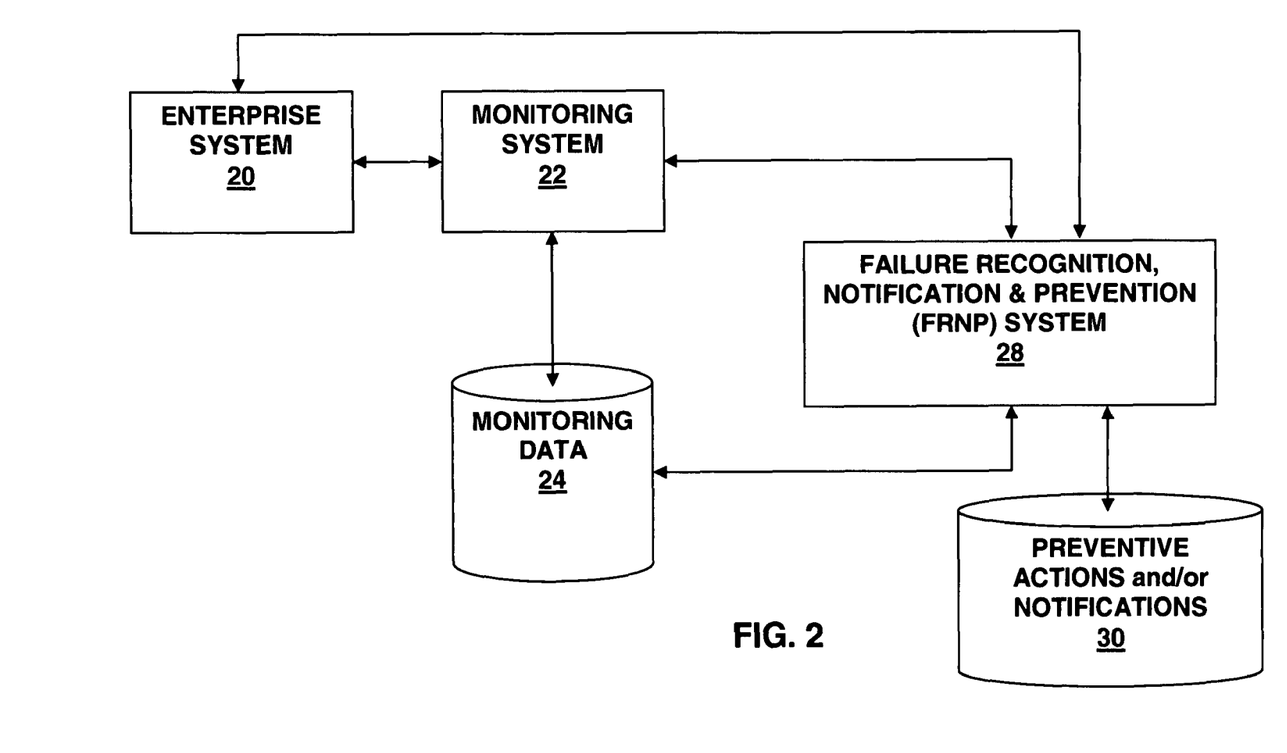
FIG. 2 depicts an illustrative system for implementing a method in accordance with an embodiment of the present invention.

In step S1, an enterprise system 20 is monitored by a monitoring system 22, which is configured to collect monitoring data 24 from the enterprise system 20. The monitoring system 22 is also configured to identify/detect/recognize system failures in the enterprise system 20. Alternatively, a separate system can be used to identify/detect/recognize system failures in the enterprise system 20 and to notify the monitoring system 20 of such failures. The enterprise system 20 may comprise, for example, a three-tier infrastructure (e.g., Apache Web Server, IBM® WebSphere® application, and DB2® database) for an enterprise application that provides a web site for customer access and a repository for information to be queried by customers (IBM, WebSphere and DB2 are trademarks of International Business Machines in the United States, other countries, or both). The enterprise system 20 can be monitored continuously by the monitoring system 22, or periodically at a rate (typically application specific) sufficient to allow for use of the present invention.

Figure 3:
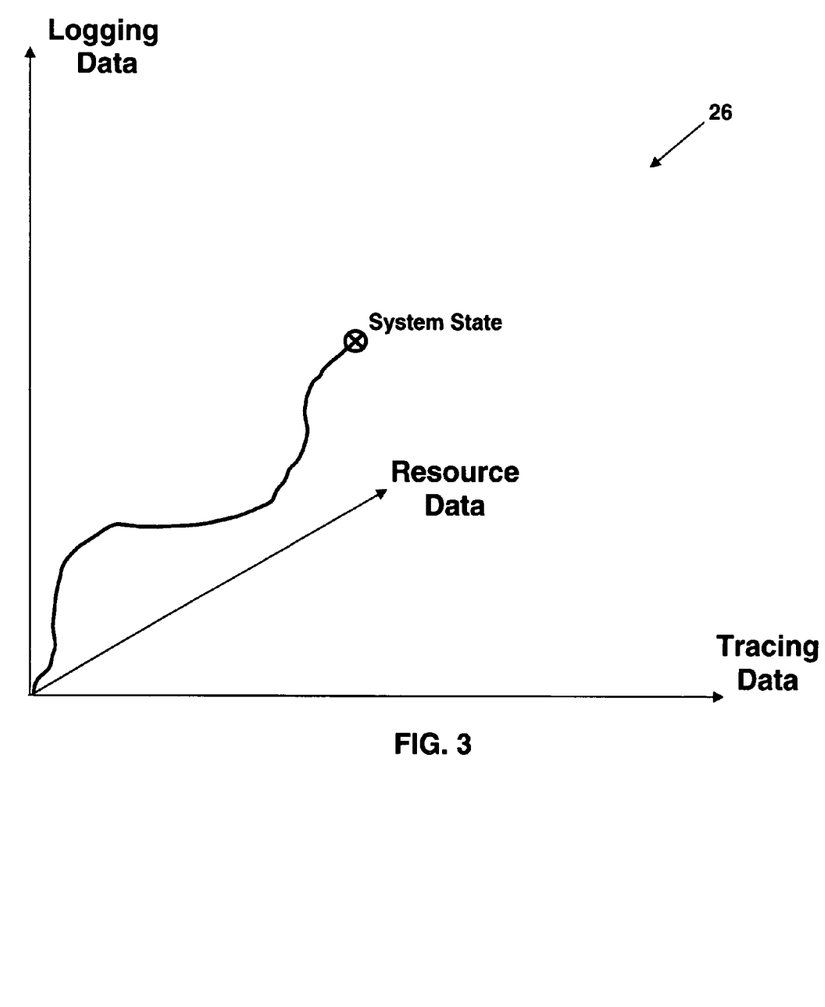
FIG. 3 depicts a graph for providing system state information based on monitoring data in accordance with an embodiment of the present invention.

The monitoring data 24 for the enterprise system 20 in this example comprises three types of data: tracing, resource and logging. Each type of monitoring data 24 provides system state information of the enterprise system 20 in a different context. The tracing data represents the flow of execution of the enterprise application and system components (e.g., J2EE™ infrastructure components such as an Enterprise Java™ Bean (EJB™) container, Web container, etc.) (Java and all Java-related marks are trademarks of Sun Microsystems in the United States, other countries or both). The resource data provides statistical information regarding the state of the computing system resources such as central processing unit (CPU) load, memory usage, graphical device interface (GDI) objects, I/O reads and writes, handles, threads, etc. The logging data represents system state in the form of correlated log records for the components of enterprise system 20. As shown in FIG. 3, the system state of the enterprise system 20 can be visualized by graphing the monitoring data 24 in a three-dimensional tracing-resource-logging space 26.

In step S2 of FIG. 1, the system state of the enterprise system 20 is examined to determine if the enterprise system 20 is approaching a previously identified failure point. If so, a set of preventive actions and/or notifications associated with that failure point is activated. If not, flow passes to step S3. Steps S2 and S3 will be described in greater detail below.

In step S4 of FIG. 1, when a system failure (e.g., system crash, abnormal system state, etc.) is detected in the enterprise system 20, the tracing-resource-logging data (i.e., monitoring data 24) corresponding to the state of the enterprise system 20 at the time of the system failure is used to identify (step S5) a failure point in the tracing-resource-logging space 26. In step S6, information regarding the identified failure point is forwarded to a failure recognition, notification and prevention (FRNP) system 28 as part of a learning process. In step S7, the FRNP system 28 associates a defined set of preventive actions and/or notifications 30 to the failure point identified in step S5. The identified failure point and the set of preventive actions and/or notifications 30 associated therewith are then stored by the FRNP system 28. Flow then passes back to step S1 and the process is repeated. The set of preventive actions and/or notifications 30 can be defined manually by a user/administrator and provided to the FRNP system 28 and/or can be provided automatically to the FRNP system 28 (e.g., by referencing a table based on the identified failure point). Other suitable techniques for providing the set of preventive actions and/or notifications 30 are also possible.

Figure 4:
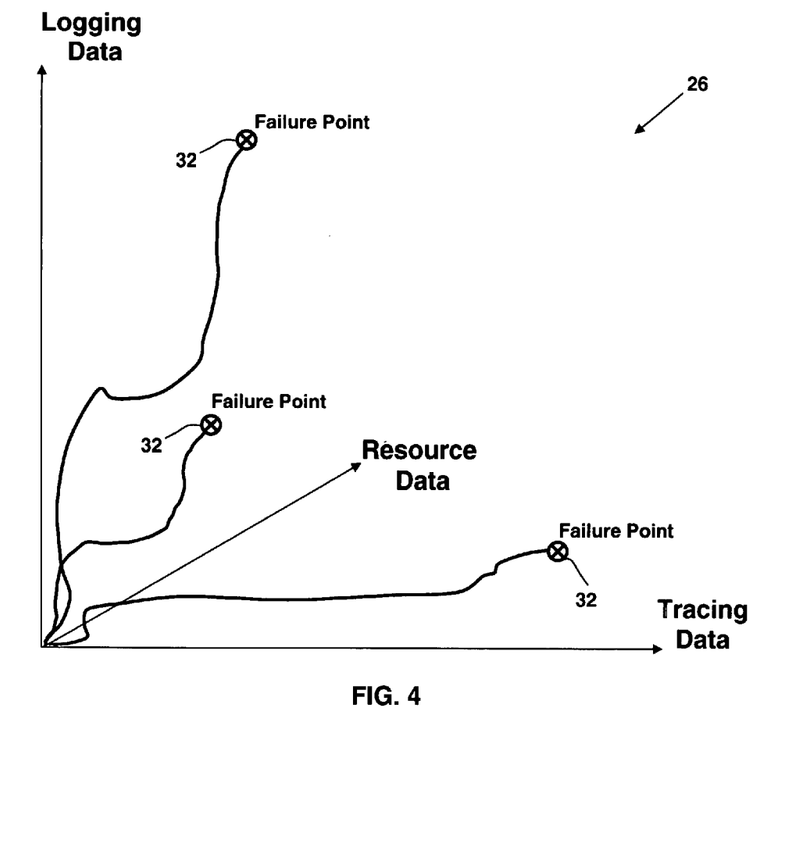
FIG. 4 depicts a plurality of failure points in the graph of FIG. 3.

The locations of a plurality of illustrative failure points 32 in the tracing-resource-logging space 26 for the enterprise system 20 are illustrated in FIG. 4. The longer the enterprise system 20 operates and is monitored by the monitoring system 22, the more failure points 32 can be identified, forwarded to the FRNP system 28, and stored along with associated preventive actions and/or notifications 30. In this manner, the FRNP system 28 learns of each identified failure point and the preventive actions and/or notifications 30 associated therewith and becomes "smarter" as time goes on. This adds to the robustness and self-healing capabilities of the enterprise system 20. For example, based on the preventive actions and/or notifications associated with identified failure points 32 and forwarded to the enterprise system 20 by the FRNP system 28, the enterprise system 20 can take appropriate preemptive steps to ensure that its system state will "avoid" or "detour around" any identified failure points 32 known to the FRNP system 28.

Figures 5, 6:
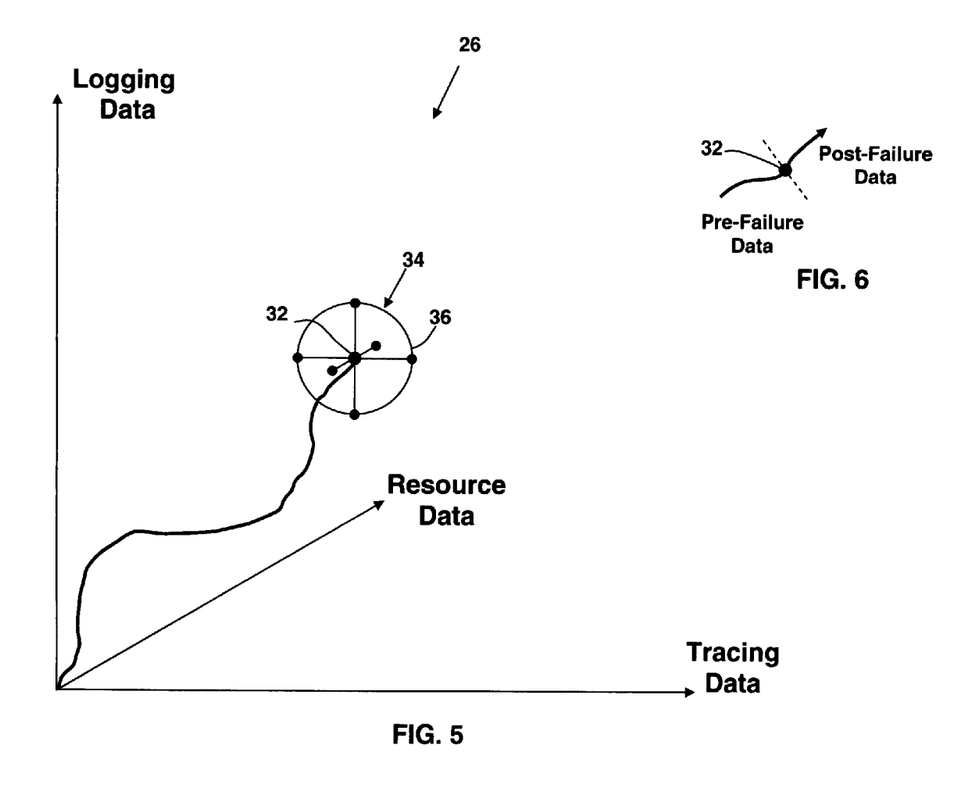
FIG. 5 depicts the values of monitoring data in an immediate neighborhood of a failure point in accordance with an embodiment of the present invention.
FIG. 6 depicts pre- and post-failure data in the immediate neighborhood of a failure point in accordance with an embodiment of the present invention.

Each failure point 32 is uniquely identified by specific values of the tracing-resource-logging data. The values of the tracing-resource-logging data in the immediate neighborhood 34 of each failure point 32 can also be identified as shown in FIG. 5. A cross-section 36 of the neighborhood 34 along the tracing data—logging data plane is illustrated in FIG. 5. The tracing-resource-logging data in the immediate neighborhood 34 of a failure point 32 can be divided into pre-failure data and post-failure data that identify pre- and post-failure states of the enterprise system 20, respectively. An example of this (in two dimensions) is shown in FIG. 6.

The pre-failure values of the tracing-resource-logging data can be used to identify critical system states where the enterprise system 20 is approaching a failure point 32 (step S2, FIG. 1). In particular, in cases where the system state approaches any system failure point 32 recognized by the FRNP system 28, the FRNP system 28 activates the preventive actions and/or notifications 30 defined for that particular system failure. This allows preventive actions to be activated (step S3, FIG. 1) to prevent the failure, to assure a controlled failure with recovery, and/or to perform other associated actions. Notifications (e.g., "System shutdown in 5 minutes") regarding an impending failure can be provided to the consumers/clients of the enterprise system 20 to enable the consumers/clients, for example, to take their own preventive actions (e.g., immediately save data). For situations where the failure cannot be prevented, the post-failure values of the tracing-resource-logging data can be used, for example, to trigger appropriate recovery procedures, to inform the consumers/clients of the enterprise system 20 of the failure (e.g., "System unavailable for 1 hour"), to provide the consumers/clients of the enterprise system 20 with instructions for recovering from the failure, etc.

Figure 7:
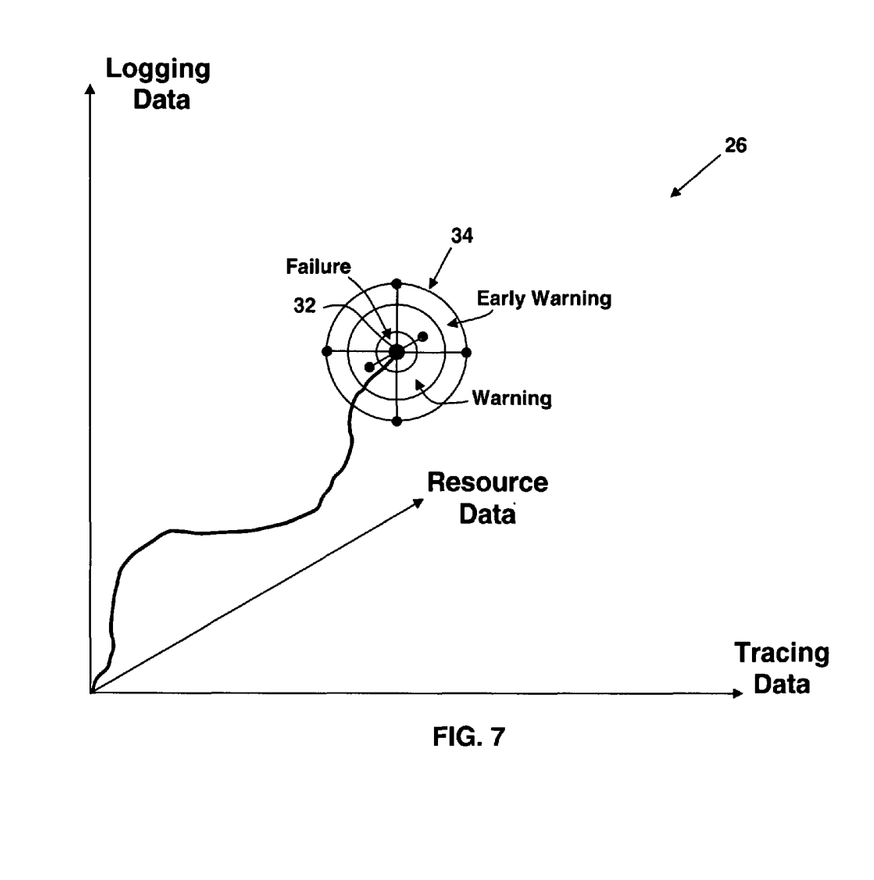
FIG. 7 depicts multiple levels of failure prevention/notification for a failure point in accordance with an embodiment of the present invention.

Various levels of failure recognition/notification/prevention can be used in the practice of the present invention. For example, as shown in FIG. 7, three levels of failure recognition/notification/prevention can be used: "early warning," "warning," and "failure." Each level of failure recognition/notification/prevention can be identified by a range of the pre-failure data in the immediate neighborhood of a failure point 32, and can have defined preventive actions and/or notifications 30 associated therewith that will be triggered whenever the system state reaches any point within the space defined by that range.

Figure 8:
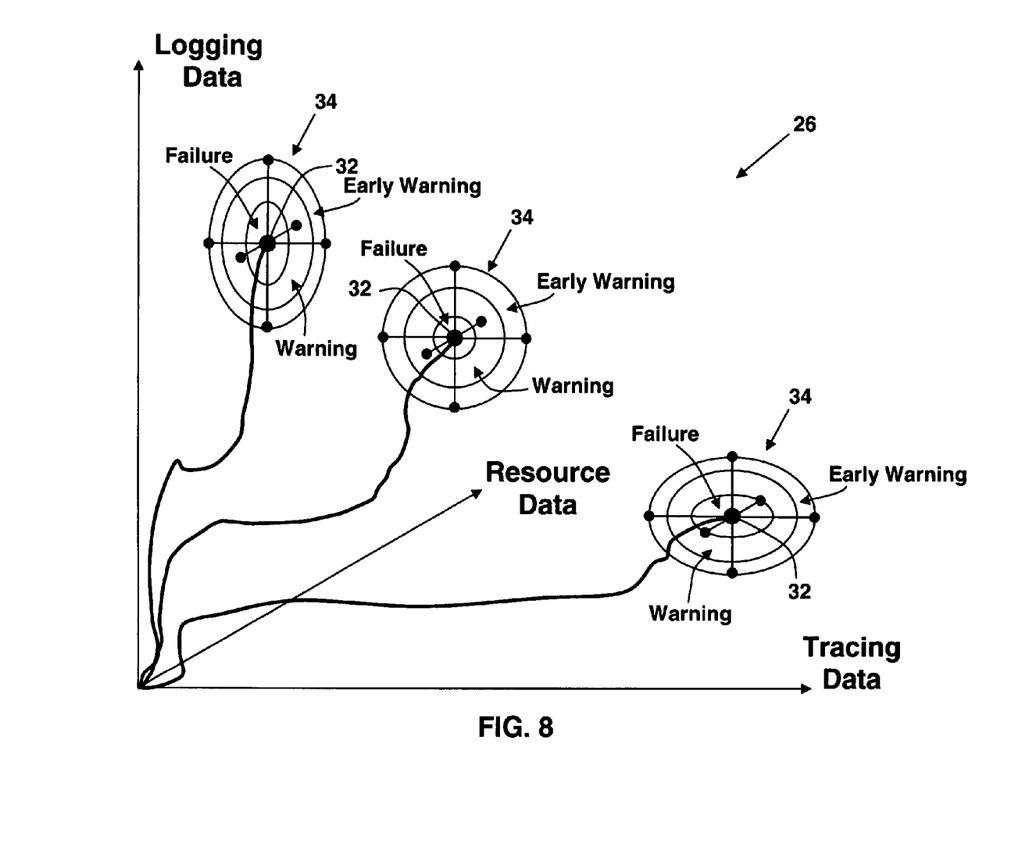
FIG. 8 depicts a plurality of failure points each having multiple levels of failure prevention/notification in accordance with an embodiment of the present invention.

FIG. 8 illustrates a plurality of failure points 32, each with a plurality of levels of failure recognition/notification/prevention in accordance with the present invention. This scenario may correspond to a "mature" enterprise system 20 that has been monitored for an extended period of time. It should be noted that the various ranges of the monitored data used to define the levels of failure recognition/notification/prevention can be different as indicated by the elliptical ranges around two of the three failure points 32.

The present invention provides enterprise system 20 with autonomic self-healing capabilities through the operation of the FRNP system 28 and the monitoring of tracing-resource-logging data. It should be noted that the monitoring data 24 may be extended to include other types of data as well. For example, the additional monitoring of network traffic data would extend the system state space to four dimensions (one dimension for each of the tracing-resource-logging-network data).

Figure 9:
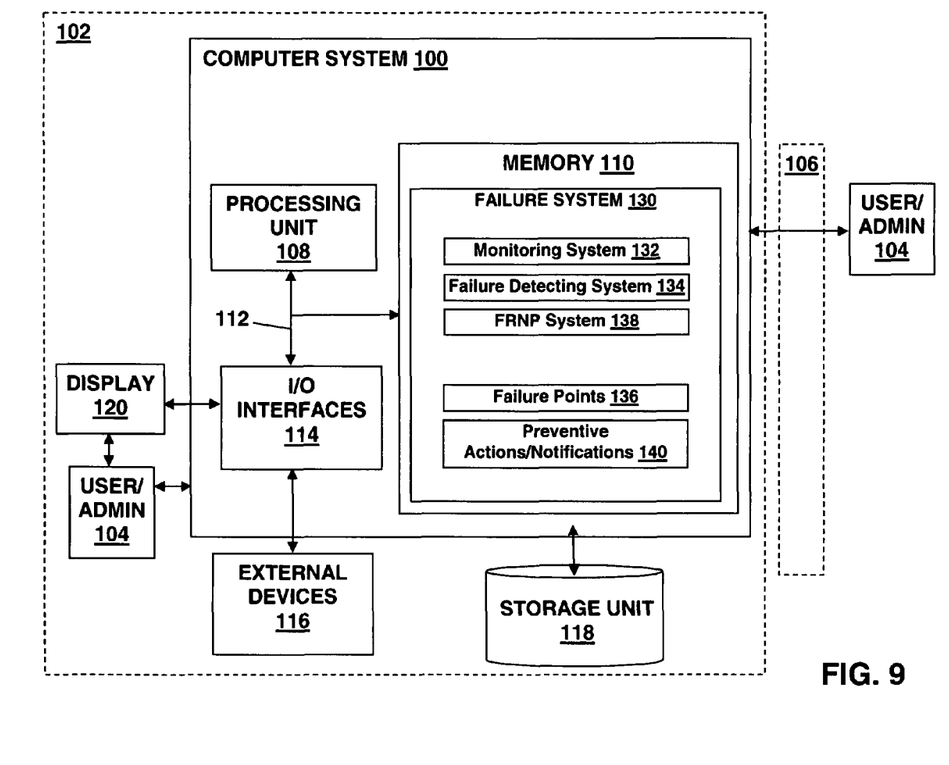
FIG. 9 depicts an illustrative computer system for implementing a method in accordance with an embodiment of the present invention.

A computer system 100 for providing failure recognition, notification, and prevention in accordance with an embodiment of the present invention is depicted in FIG. 9. Computer system 100 is provided in a computer infrastructure 102. Computer system 100 is intended to represent any type of computer system capable of carrying out the teachings of the present invention. For example, computer system 100 can be a laptop computer, a desktop computer, a workstation, a handheld device, a server, a cluster of computers, etc. In addition, as will be further described below, computer system 100 can be deployed and/or operated by a service provider that provides failure recognition, notification, and prevention in accordance with the present invention. It should be appreciated that a user/administrator 104 can access computer system 100 directly, or can operate a computer system that communicates with computer system 100 over a network 106 (e.g., the Internet, a wide area network (WAN), a local area network (LAN), a virtual private network (VPN), etc). In the case of the latter, communications between computer system 100 and a user-operated computer system can occur via any combination of various types of communications links. For example, the communication links can comprise addressable connections that may utilize any combination of wired and/or wireless transmission methods. Where communications occur via the Internet, connectivity can be provided by conventional TCP/IP sockets-based protocol, and an Internet service provider can be used to establish connectivity to the Internet.

Computer system 100 is shown including a processing unit 108, a memory 110, a bus 112, and input/output (I/O) interfaces 114. Further, computer system 100 is shown in communication with external devices/resources 116 and one or more storage unit 118. In general, processing unit 108 executes computer program code, such as failure system 130, that is stored in memory 110 and/or storage system(s) 118. While executing computer program code, processing unit 108 can read and/or write data, to/from memory 110, storage system(s) 118, and/or I/O interfaces 114. Bus 112 provides a communication link between each of the components in computer system 100. External devices/resources 116 can comprise any devices (e.g., keyboard, pointing device, display (e.g., display 120, printer, etc.) that enable a user to interact with computer system 100 and/or any devices (e.g., network card, modem, etc.) that enable computer system 100 to communicate with one or more other computing devices.

Computer infrastructure 102 is only illustrative of various types of computer infrastructures that can be used to implement the present invention. For example, in one embodiment, computer infrastructure 102 can comprises two or more computing devices (e.g., a server cluster) that communicate over a network (e.g., network 106) to perform the various process steps of the invention. Moreover, computer system 100 is only representative of the many types of computer systems that can be used in the practice of the present invention, each of which can include numerous combinations of hardware/software. For example, processing unit 108 may comprise a single processing unit, or can be distributed across one or more processing units in one or more locations, e.g., on a client and server. Similarly, memory 110 and/or storage system 118 can comprise any combination of various types of data storage and/or transmission media that reside at one or more physical locations. Further, I/O interfaces 114 can comprise any system for exchanging information with one or more external devices/resources 116. Still further, it is understood that one or more additional components (e.g., system software, math co-processor, cache memory, etc.) not shown in FIG. 9 can be included in computer system 100. However, if computer system 100 comprises a handheld device or the like, it is understood that one or more external devices/resources 116 (e.g., a display) and/or one or more storage unit(s) 118 can be contained within computer system 100, and not externally as shown.

Storage system(s) 118 can be any type of system (e.g., a database) capable of providing storage for information under the present invention. Such information can include, for example, monitoring data 24 (FIG. 1), failure points 32, preventive actions and/or notifications 30 (FIG. 1), etc. To this extent, storage system(s) 118 can include one or more storage devices, such as a magnetic disk drive or an optical disk drive. In another embodiment, storage system(s) 118 can include data distributed across, for example, a local area network (LAN), wide area network (WAN) or a storage area network (SAN) (not shown). Although not shown, additional components, such as cache memory, communication systems, system software, etc., may be incorporated into computer system 100. Moreover, although not shown, computer systems operated by user/administrator 104 can contain computerized components similar to those described above with regard to computer system 100.

Shown in memory 110 (e.g., as a computer program product) is a failure system 130 for providing failure recognition, notification, and prevention in accordance with an embodiment of the present invention. Failure system 130 includes a monitoring system 132 for collecting monitoring data from a system (e.g., from an enterprise system). The monitoring system 132 is also configured to identify/detect/recognize system failures in the system being monitored or to receive notification of such failures from a separate system, such as failure detecting system 134. When a system failure is detected, the monitoring system 132 identifies a failure point 136 corresponding to the state of the system being monitored at the time of the system failure and forwards the failure point 136 to a failure recognition, notification and prevention (FRNP) system 138 as part of a learning process. In response, the FRNP system 138 associates a defined set of preventive actions and/or notifications 140 to the failure point 136. In cases where the state of the system being monitored approaches any system failure point 136 recognized by the FRNP system 138, the FRNP system 138 activates the preventive actions and/or notifications 140 defined for that particular system failure.

The present invention can be offered as a business method on a subscription or fee basis. For example, one or more components of the present invention can be created, maintained, supported, and/or deployed by a service provider that offers the functions described herein for customers. That is, a service provider can be used to provide failure recognition, notification, and prevention, as described above.

The flowchart and block diagrams of the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is apparent to one skilled in the art that numerous modifications and departures from the specific embodiments described herein may be made without departing from the spirit and scope of the invention.

What is claimed is:

1. A method for failure recognition, comprising:

monitoring a system to collect monitoring data;

detecting a failure of the system, wherein the failure includes an abnormal system state;

identifying a failure point for the detected failure in a data space defined by the monitoring data;

associating at least one predefined action with the identified failure point;

identifying values of the monitoring data in a neighborhood of the identified failure point;

dividing the neighborhood of the identified failure point into pre-failure data and post-failure data, wherein the pre-failure data and post-failure data identify pre-failure and post-failure states of the system, respectively;

dividing the pre-failure data into a plurality of ranges and associating a unique predefined action with each of said ranges;

determining if a state of the system reaches a point within a space defined by one of the plurality of ranges;

in response to said state of the system reaching a point within a space defined by one of the plurality of ranges, performing said unique predefined action associated with said one of the plurality of ranges; wherein each of the unique predefined actions comprises an automatic self-healing preventive action and at least one of the unique predefined actions further comprises a notification, wherein the notification comprises an indicator of system unavailability and a period of unavailability; and outputting a representation of the performed predefined action.

2. The method of claim 1, further comprising:
automatically avoiding the identified failure point during operation of the system.

3. The method of claim 1, further comprising:
detecting at least one additional failure of the system; and
repeating the detecting, identifying, and associating steps for each additional detected failure, wherein a plurality of identified failure points are identified, and wherein a unique predefined action is associated with each of the plurality of identified failure points.

4. The method of claim 3, further comprising:
determining if a state of the system is approaching any of the plurality of identified failure points.

5. The method of claim 4, further comprising:
if the state of the system is approaching any of the identified failure points, performing the predefined action associated with that failure point.

6. The method of claim 3, further comprising:
automatically avoiding any of the plurality of identified failure points during operation of the system.

7. The method of claim 1, wherein the data space defined by the monitoring data comprises a multi-dimensional data space.

* * * * *